Figure 1A:
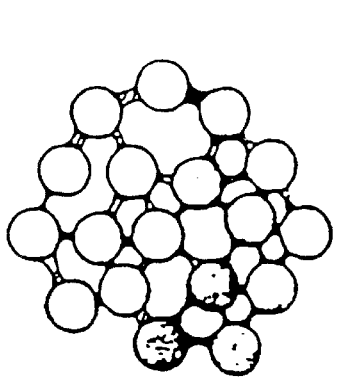

United States Patent
Virtanen

[19]

[11] Patent Number: 6,143,064
[45] Date of Patent: Nov. 7, 2000

[54] PIGMENT PARTICLES COATED WITH PRECIPITATED CALCIUM CARBONATE AND A PROCESS FOR THE PREPARATION THEREOF

[75] Inventor: Pentti Virtanen, Toijala, Finland

[73] Assignee: FP-Pigments Oy, Espoo, Finland

[21] Appl. No.: 09/125,890

[22] PCT Filed: Mar. 4, 1997

[86] PCT No.: PCT/FI97/00144

§ 371 Date: Oct. 27, 1998

§ 102(e) Date: Oct. 27, 1998

[87] PCT Pub. No.: WO97/32934

PCT Pub. Date: Sep. 12, 1997

[30] Foreign Application Priority Data

Mar. 4, 1996 [FI] Finland ..................................... 961003
Oct. 29, 1996 [FI] Finland ..................................... 964365

[51] Int. Cl.[7] .............................. C09C 1/02; C09C 1/36; C09C 1/42; D21H 17/67; D21H 19/40
[52] U.S. Cl. ........................... 106/449; 106/464; 106/486; 428/403; 427/215
[58] Field of Search ..................................... 106/449, 464, 106/486; 428/403; 427/215

[56] References Cited

U.S. PATENT DOCUMENTS

| | | | |
|---|---|---|---|
| 3,661,610 | 5/1972 | Ferris | 106/306 |
| 3,674,529 | 7/1972 | Toms | 106/306 |
| 4,824,654 | 4/1989 | Ota et al. | |
| 5,364,610 | 11/1994 | Merris, Jr. | |
| 5,650,002 | 7/1997 | Bolt | 106/449 |

FOREIGN PATENT DOCUMENTS

| | | |
|---|---|---|
| 0521737A1 | 1/1993 | European Pat. Off. |
| 0573150B1 | 12/1993 | European Pat. Off. |
| 2759551 | 2/1981 | Germany |
| 2242998 | 9/1990 | Japan |
| 9623728 | 8/1996 | WIPO |
| 9732934 | 9/1997 | WIPO |

*Primary Examiner*—C. Melissa Koslow
*Attorney, Agent, or Firm*—Birch, Stewart, Kolasch & Birch, LLP

[57] ABSTRACT

This invention relates to a pigment particle product and a method for its preparation. According to the invention pigment particles, such as kaolin, natural calcium carbonate or titanium dioxide, and precipitated calcium carbonate are mixed together in an aqueous phase at pH 6–11, which causes the pigment particles to become coated with particles of precipitated calcium carbonate. The brightness of the product is excellent, and it is quite inexpensive to produce.

10 Claims, 6 Drawing Sheets

PIGMENT PARTICLES COATED WITH PRECIPITATED CALCIUM CARBONATE AND A PROCESS FOR THE PREPARATION THEREOF

This application is the national phase under 35 U.S.C. §371 of prior PCT International Application No. PCT/FI97/00144 which has an International filing date of Mar. 4, 1997 which designated the United States of America, the entire contents of which are hereby incorporated by reference.

The present invention relates to products comprising pigment particles coated with precipitated calcium carbonate (PCC), when particles are precipitated calcium carbonate range in size from 30 to 100 nm and said particles are attached to the surfaces of the pigment particles of said product and from 30 to 90% by weight of calcium carbonate are present in said particles.

The invention also relates to a method for preparing such pigment products. According to the method pigment particles and PCC are mixed together in liquid phase to obtain a pigment/PCC suspension in this method according to the invention for coating particles with precipitated calcium carbonate, an aqueous suspension of pigment carbonate is formed by mixing in a mixer, the pH of said aqueous suspension being adjusted to a value within the range 6–11, and agglomerates at precipitated calcium are first formed before mixing to a particle size in the range of 30–400 nm, and thereafter these agglomerates are disintegrated to calcium carbonate particles of 30–100 nm particle size, so that the resultant particles of calcium carbonate are attached to the surfaces of the pigment particles.

Filler and coating pigments are used in paper manufacturing. The reasons for this are economical and technical; low cost mineral pigments can be used to replace a portion of the expensive fibre material. This also leads to improvements in the printing properties, such as opaqueness, whiteness and gloss, of the paper.

Commonly used filler and coating pigment materials include kaolin, talcum, calcium carbonate and titanium dioxide. Kaolin is an aluminum silicate mineral of plate-like or flake-like particle shape, prepared form natural kaolin by purification and fractionation. Calcium carbonate may be from natural minerals or synthetic. Natural calcium carbonates include chalk and calcium carbonate obtained from ground limestone, GCC (Ground Calcium Carbonate). Synthetic carbonates are prepared by precipitation, and are called precipitated calcium carbonate, PCC. Titanium dioxide is typically prepared from ilmenite ore.

As a filler kaolin has many valuable properties from the point of view of paper technology. Thus, it improves the optical properties of paper, such as gloss, light scattering and brightness. Kaolin does not form essentially any dust, it adheres well to paper (good adhesion properties or retention), and most often it is of very uniform quality. Kaolin is also used as a coating pigment. The function of the coating is to cover the fibre network pattern of base paper with a pigment-adhesive mixture which improves the printing properties of the paper. Different qualities of paper as well as different manufacturing processes and printing methods determine the order in which different factors are to be regarded as essential. The proportion of the pigment in the coating paste used for coating paper is 80–95%, wherefore the effect of kaolin used in coating pigments on the properties of paper is greater than that of kaolin used in the filler. It may be regarded as a disadvantage when using kaolin both as a filler and as a coating that the ISO brightness of kaolin is rather low compared to other pigments, typically about 90.

Natural calcium carbonates have the disadvantage that the qualities which are of sufficient brightness to be used in paper coatings or fillers are becoming increasingly rare and often require transportation over long distances.

The disadvantage with titanium dioxide is its high price. It is possible to reduce the cost by mixing titanium dioxide with other pigments and fillers, but this also impairs the quality. For the preparation of pigment products of high quality it is desirable to have the pigment particles at a distance from each other that is comparable to the dimensions of the particles themselves. When used in the form of a powder, pigment particles often adhere to each other forming flocs or agglomerates.

It is possible to obtain good brightness and opacity for paper when using PCC, regardless of whether it is used as a filler or a coating pigment. However, its gloss and retention are inferior to those of, for example, kaolin. The brightness of PCC is 94, and its color is bluish (the color of kaolin being yellowish).

The object of this invention is to provide a product that combines the advantageous properties of conventional pigment particles and PCC while avoiding their disadvantages. The object of the invention is to provide a pigment-based product, in which pigment particles, especially titanium dioxide particles, are a desired distance apart form each other. Preferably, these particles are at distance from each other that is at least approximately equal to their size. This provides enhanced brightness of the product.

It is known in the art that, for example, kaolin and PCC may be used simultaneously in coating pastes, and that both kaolins and PCC may be used separately as filler material in paper. For preparing coating pastes kaolin and PCC, and possible other components, such as dispersion agents, latex resins and starch, are mixed together in an aqueous phase in order to obtain an aqueous sludge. During this process a physical mixture of kaolin and PCC and of other components is formed. With a 1:1 weight ratio of kaolin and PCC, such a mixture improves the brightness of a paper coating kaolin paste by a maximum of 2 units. Precipitation with kaolin, on the other hand, does not improve the retention of PCC particles to any significant extent.

According to the present invention the basic principle is employed of improving the pigment and filler properties of pigment particle products, such as kaolin, calcium carbonates and/or titanium dioxide, by coating them with precipitated calcium carbonate in such a way that small precipitated particles of calcium carbonate adhere to the surfaces of the pigment particles. The pigment particles and the PCC particles are mixed together in aqueous phase in order to obtain a product of the type described above, while keeping the pH of the aqueous phase alkaline, particularly at about pH 6–11, preferably about 6.3–10.8. Thus, PCC particles of 10–400 nm, preferably 30–100 nm, are caused to bind to the pigment particles essentially by physical forces.

According to the invention flocs and agglomerates are dispersed and the pigment particles are coated with PCC particles, which causes, for example, titanium oxide pigments to become sufficiently separated away from each other.

More specifically, the pigment product according to the invention comprises from 30 to 90% by weight of particles of precipitated calcium carbonate that range in size from 30 to 100 nm, and said particles are attached to the surfaces of the pigment particles of said product.

However, the method of the invention comprises a method for coating particles with precipitated calcium carbonate, wherein an aqueous suspension of pigment carbonate is formed by mixing in a mixer, the pH of said aqueous suspension being adjusted to a value in the range of 6–11, and wherein agglomerates of precipitated calcium are first formed before mixing to a particle size in the range of 30 to 400 nm, and thereafter these agglomerates are disintegrated to calcium carbonate particles of 30 to 100 nm particle size, whereby the resultant particles of calcium carbonate are attached to the surfaces of the pigment particles.

The invention has considerable advantages. Consequently, the base material used for the preparation of pigments or fillers can be kaolin, inexpensive natural carbonates or titanium dioxide or similar pigments which form the core (matrix) which is coated with PCC particles having a diameter of 30–400 nm, preferably of 30–100 nm, the particles obtaining improved brightness and opacity of the entire product. Coating kaolin with PCC gives kaolin some of the brightness and opacity of PCC. With a 1:1 mass ratio of kaolin and PCC, the opacity of the kaolin paste is increased by 2–4 units.

In a titanium dioxide/PCC product, the refractive index of $TiO_2$ is the decisive factor, but the gas space left in between the PCC particles may improve it. The PCC particles increase porosity and consequently also scattering. The relative difference in particle size is decreased. The distance between particles is almost always ideal for $TiO_2$, that is, of the order of the particle diameter when coated with PCC. When super-calendering paper, the pressure between the rollers presses the pigment particles in such a way that their density is increased, and the distances between the $TiO_2$ particles are decreased. When a coating is applied, the $TiO_2$ particles are not caused to become into too close proximity with one another. Typically, the distances between the pigment particles are greater than about 60 nm, for example, about 100 nm.

By causing the filler substance to attach to the surface of the pigment, it is possible to maximize the amount of filler and the efficiency of the pigment, while taking into account the grain size, distribution and porosity of the pigment.

Also economical advantages are achieved due to the fact that only a small amount (10%) of $TiO_2$ is needed to obtain a product which has the same degree of brightness as conventional (100%) titanium dioxide.

The use of a filler usually requires an increased amount of binder, but when the filler is attached to the surface of the pigment, the amount of binder is decreased, which is caused by the apparent increase in the size of the pigment particles.

Figure 1B:
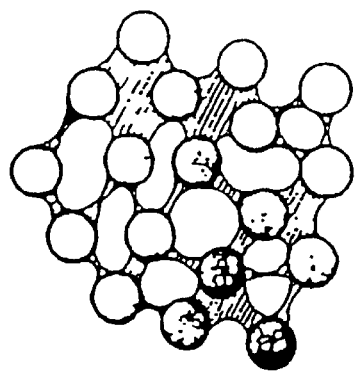
Figure 1C:
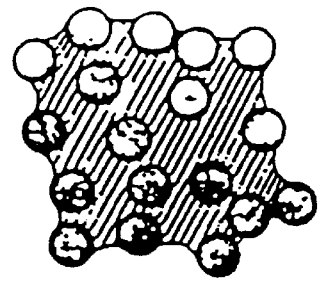
Figure 2:
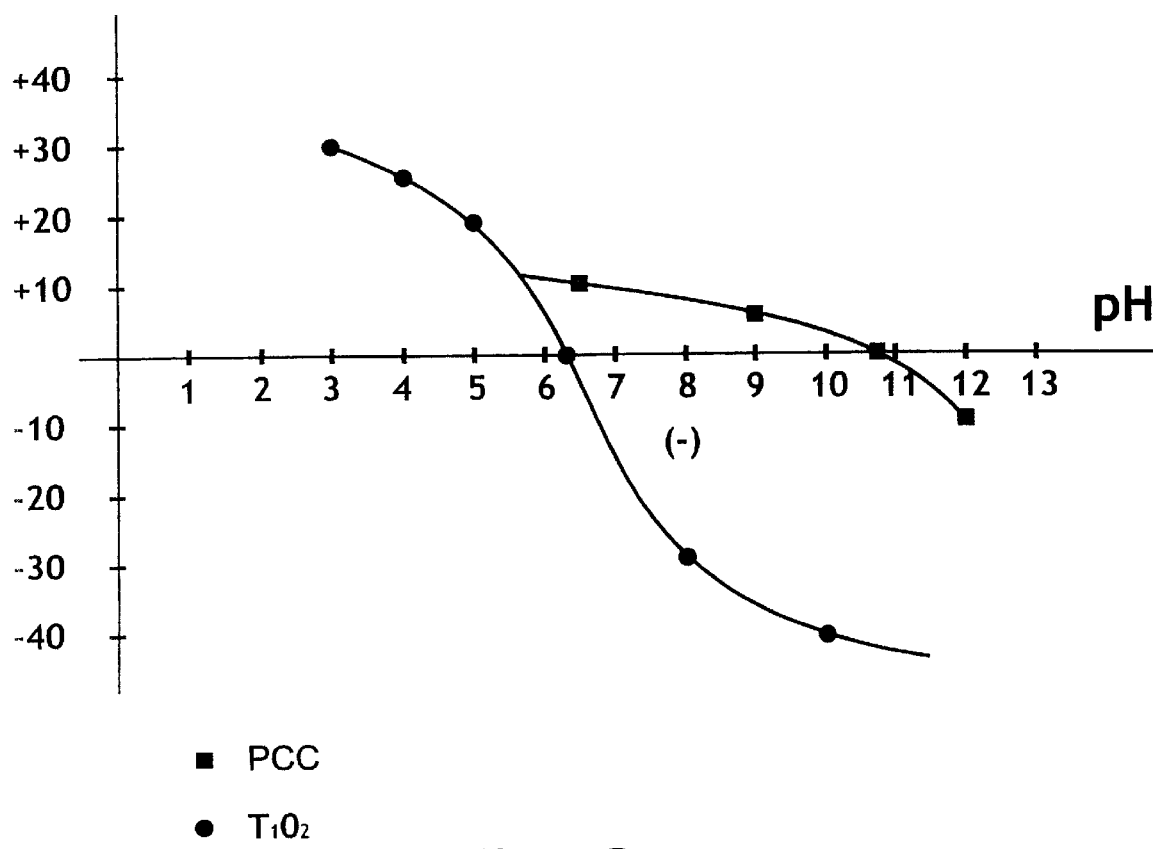
Figure 3A:
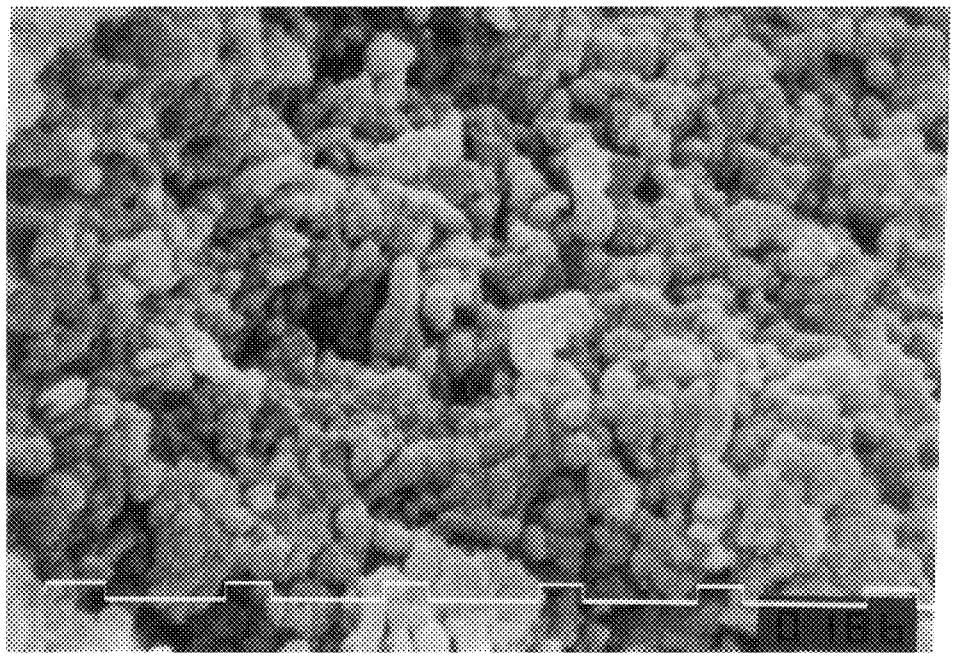
Figure 3B:
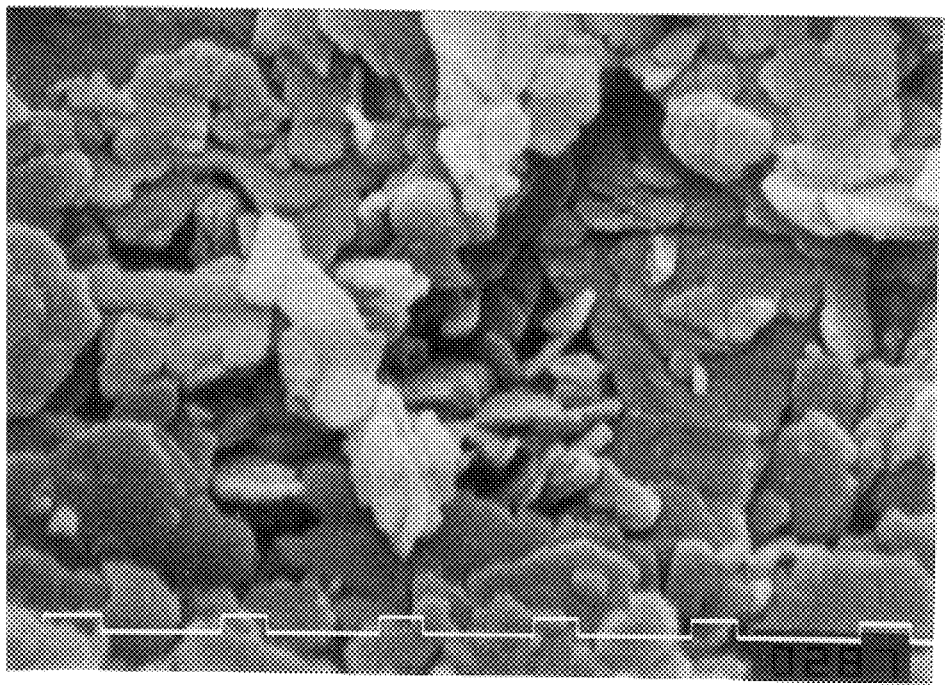
Figure 3C:
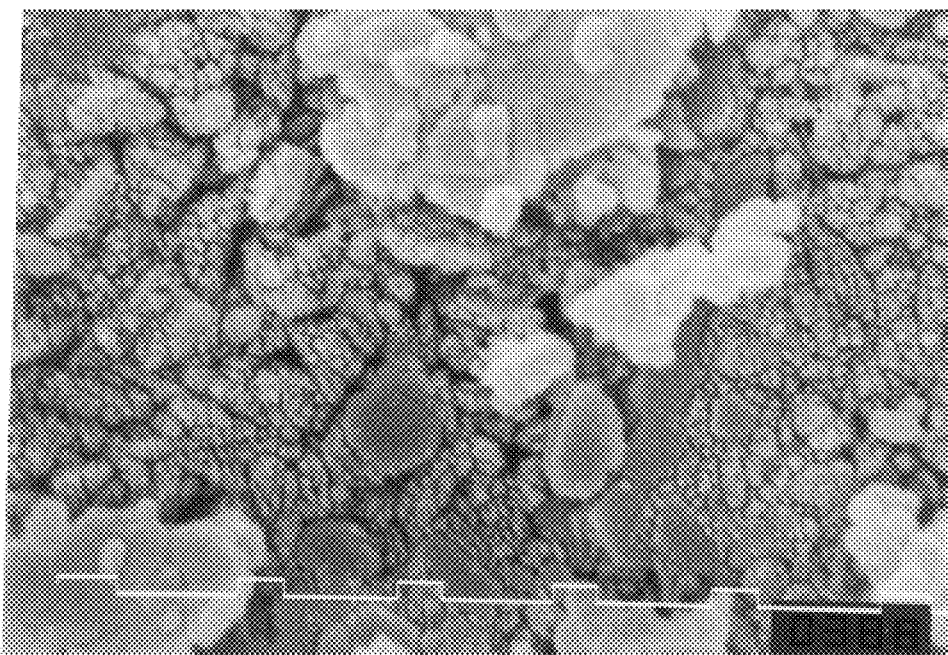
Figure 4A:
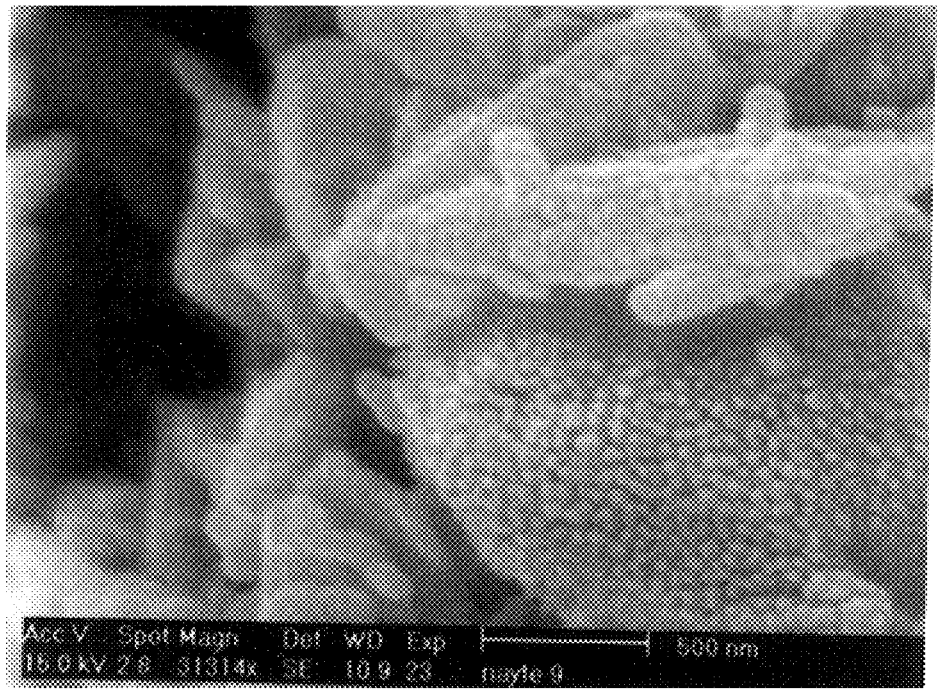
Figure 4B:
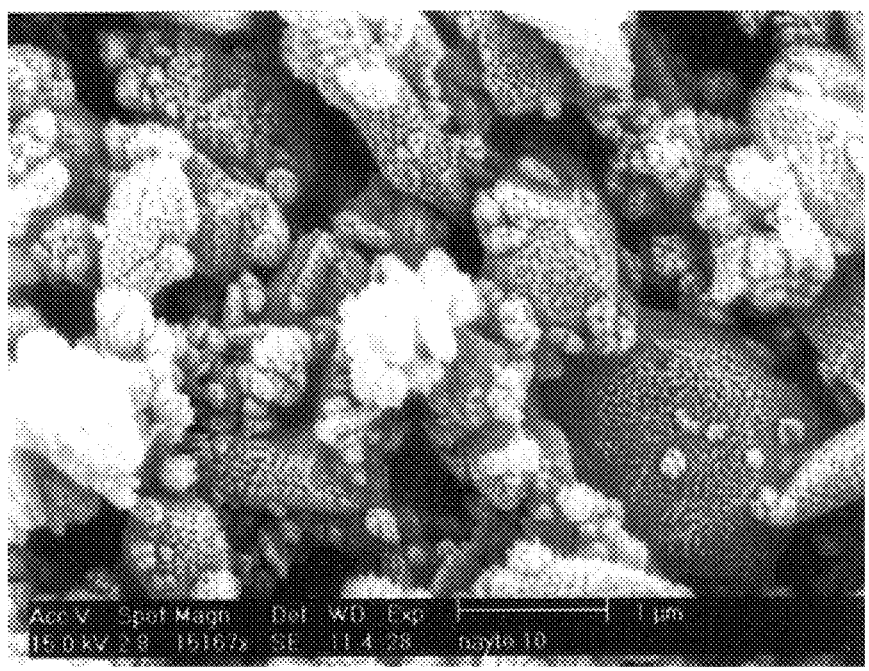
Figure 5A:
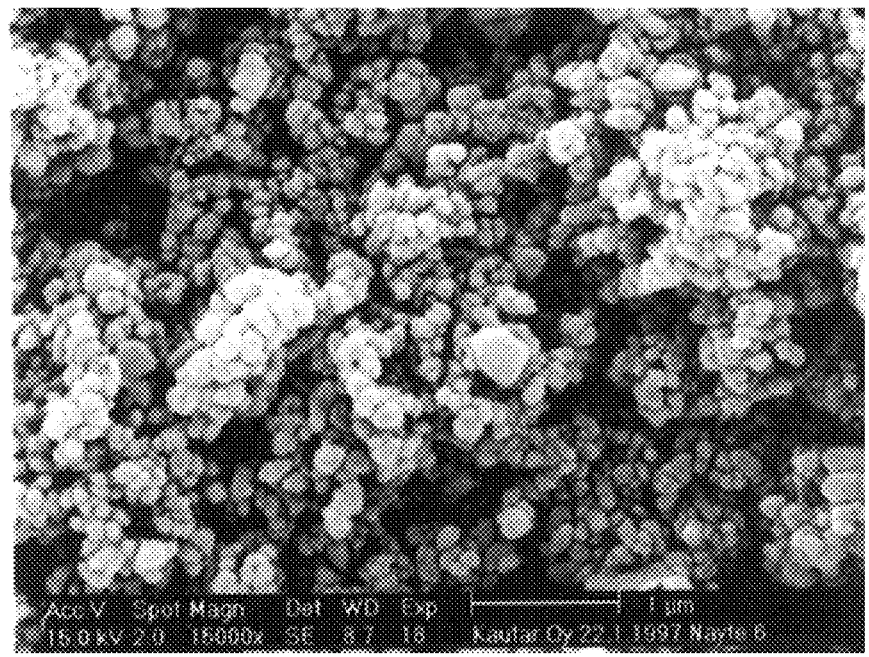
Figure 5B:
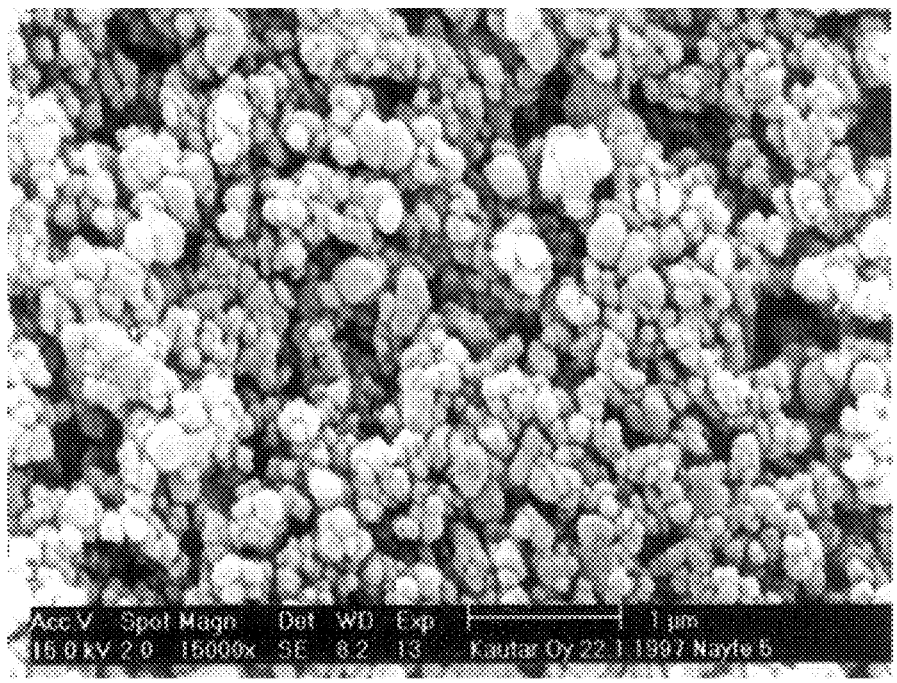
Figure 5C:
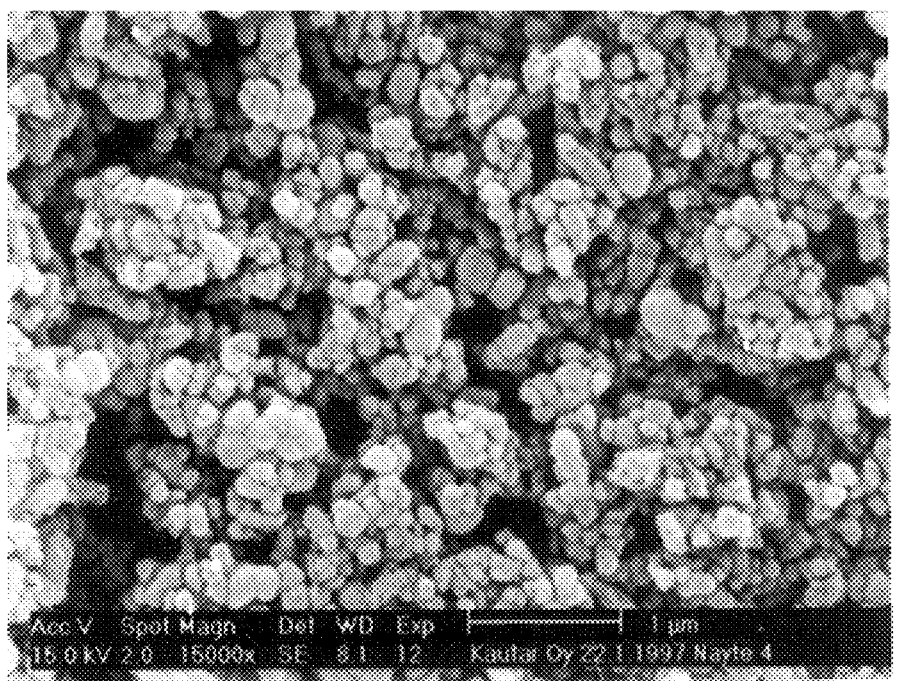

The invention is described in the following with the aid of the enclosed figures and a detailed description of the invention, in which FIGS. 1a–1c illustrates an agglomerate formed by PCC particles, where the particles are connected by separate liquid bridges in FIG. 1a, by a network of bridges in FIG. 1b, and in FIG. 1c there is a capillary space filled with liquid in between the particles;

in FIG. 2 the value of the Z potential as a function of pH is shown for titanium dioxide and PCC, respectively;

in FIG. 3a a electron micrograph of precipitated calcium carbonate particles is shown, where most of the particles are smaller than 0.2 µm;

in FIG. 3b a similar representation of kaolin particles is shown;

in FIG. 3c an electron micrograph of kaolin particles coated by using the method of the invention is shown;

in FIGS. 4a and 4b electron micrographs of chalk, coated with PCC, with a PCC particle size (φ) of about 40 nm, are shown; and in FIGS. 5a–5c electron micrographs of $TiO_2$ particles coated with PCC are shown, in which figures the amount of $TiO_2$ is 10% by weight in 4a, 20% by weight in 4b, and in 4c 30% by weight of the total amount of the mixture.

In the present invention the term "pigment particles" is used to describe any known pigments and fillers which are used, for example, in manufacturing paper. The examples include kaolin (aluminum silicate with water of crystallization), aluminum hydroxide, calcium sulphate, calcium carbonate, magnesium silicate, aluminum silicate, talcum (magnesium silicate containing water of crystallization), titanium dioxide, barium sulphate and zinc oxide, and mixtures thereof. Also synthetic pigments may be used.

The calcium carbonates intended to be coated can be based on natural carbonates or they can be synthetic (PCC). The latter can comprise multinuclear PCC precipitate clusters which have a particle size of about 100–500 nm. These can be prepared according to the method described in WO Patent Application No. 96/237228, according to which it is possible to obtain very small PCC particles of similar sizes. "Small" particles of precipitated calcium carbonate are understood as being essentially about 30–100 nm, or about 120 nm at the most. The expression "the size of the particles is essentially 30–100 nm" means that a significant proportion, typically at least 50%, of the particles are in the respective range.

The particles of PCC can be bound to loose agglomerates during preparation or filtration (for example, by chamber filtration). These agglomerates may be used to obtain PCC cluster precipitates by adjusting the pH of an aqueous dispersion of PCC to the range from 6 to 11. The agglomerates can also be used as starting material for PCC when coating pigment particles. However, it must be stated that the PCC particles used for coating can be prepared by causticizing or carbonating by means of any known technique. The known methods of preparing PCC are described, for example, in U.S. Pat. No. 4,824,654, and FI patent application 942815, and in published patent application DE 2 759 551.

In the following, the formation of PCC agglomerates is described in more detail.

Generally, the attractive force between particles includes for example van der Waals force which increases with decreasing particle distances and particle diameters. Therefore, with a 0.1 µm particle diameter, the van der Waals force is about 1,000,000 Pa. When the distance between the particles is increased, the van der Waals force decreases very rapidly, and it is very small at a distance of 100 nm. The repulsive force between the particles is represented by the Z potential, which is the (electrokinetic) potential difference between the ionic field of the particle and the bulk medium. Particle fields with the same sign give rise to repulsive forces.

When no auxiliary substance is used to modify the surface of the particle, it is readily and repeatably observed that the Z potential for a particle is dependent on the pH value. The Z potential of PCC varies for calcium carbonate in the range −25 . . . −1 mV as a function of pH. It has been observed for PCC prepared by causticizing that in the pH range 8.2 . . . 8.4 the Z potential is at a minimum absolute value (about −1 . . . −5 mV). The repulsive force causing the particles to be separated from each other is also at a minimum. On the other hand, above pH 9.5 the value of the Z potential is in excess of −20 mV. At pH 7 the Z potential is approximately −6 mV, and its absolute value increases rapidly when the pH is lowered.

Therefore, the agglomerates of PCC prepared by causticizing are rather loose when the pH value is outside the range from 6 to 9.5. For PCC prepared by carbonizing, the corresponding range is about 9 to 11. From the point of view of forming the loose agglomerates it is essential that the particles are bound to each other by capillary forces. In this case the capillary and van der Waals forces bring the particles in close proximity, whereas the Z potential has an opposite effect, in which case the equilibrium like state achieved facilitates the formation of loose agglomerates from PCC.

The formation of a loose agglomerate is described in FIGS. 1a to 1c.

In the present invention the pigment particles to be coated and the PCC used for coating are brought into contact in an aqueous suspension. The pH of this aqueous suspension is adjusted to a value that results in a minimum value for the product of the Z potentials of the pigment and the coating material if these have the same sign (both are either cationic or anionic). The energy intensity required for coating is at its minimum is this case. The required energy intensity is also small when the Z potentials of the components are of opposite signs. It is possible to search for an optimum range for the Z potential by adjusting the pH.

For example, the Z potential of $TiO_2$ at pH ~6.3 is ±0, and above this value the Z potential is positive, and negative below this value. On the other hand, the Z potential of PCC is ±0 at pH ~10.8, and has a value of +10 mV at pH 6.3. On the basis of the foregoing, coating may be formed with minimal energy of mixing when performed within the pH range 6.3–10.8. In FIG. 2, the Z potentials for PCC prepared by carbonization and titanium dioxide are shown as functions of pH. The figure clearly displays a range between pH 6.3 and pH 10.8, in which the charges of the particles have opposite signs.

It has been possible to observe according to the invention that a large value for the Z potential of PCC causes the agglomerates described above, to disintegrate into smaller ones in the aqueous phase, the diameters of these smaller particles being in the range 30–100 nm, typically 30–60 nm. When the Z potential is suitable (see above), these attach to the surfaces of the pigment particles due to van der Waals forces. Thus, a pigment particle with a surface covered with small PCC particles is formed in the aqueous phase.

On the basis of the foregoing, a preferable embodiment of the invention, in which PCC agglomerates and precipitates are used for coating, comprises the following steps:

First, the pH value of the PCC suspension is adjusted to a value outside the range 6–11, to yield PCC agglomerates containing PCC particles of diameters in the range 40–400 nm, preferably 40–300 nm. For PCC prepared by causticizing, the pH value is adjusted to a value outside the range 7–9.5, and for PCC prepared by carbonizing outside the range 9–11. The adjustment of pH may take place during preparation or, for example, in a chamber filtration apparatus. If the pH is adjusted in the filter, the filtered bulk of solid is subsequently broken into a PCC suspension. Thereafter the PCC suspension is mixed in a mixer of high turbulence to form a core or matrix together with the selected pigment, while pH is simultaneously adjusted to a range suitable for coating, preferably in the range 6–11 or 6.5–10.5, whereby the Z potential is lowered to a value below –10 mV, and the PCC particles are bound to the surface of the pigment particles.

According to the method of the invention, for example, kaolin, calcium carbonate and/or titanium dioxide and PCC are mixed together in the aqueous phase within the pH range 6–11 to yield an aqueous suspension. The adjustment of the pH value may be achieved by using of suitable bases and, correspondingly, acids. Preferable bases include hydroxides and carbonates of alkali metals, especially sodium hydroxide and sodium carbonate. Preferable acids include mineral acids and organic acids, when phosphoric acid is considered particularly preferable.

According to the method the pigment particles and PCC may be added in an optional order or simultaneously into the aqueous phase. According to one preferable alternative, PCC is first mixed into water to form a PCC suspension with a content of dry solids of about 5–70%. The pH value of the aqueous suspension is set to the desired value, i.e., to about 6–11, whereafter the pigment particles are added while mixing.

In order to achieve the best possible contact between the pigment particles and PCC, the aqueous suspension is stirred intensively (by using a high energy intensity) during the addition of the second component (for example, kaolin). Flocs and agglomerates of the pigment particles to be coated can also be broken by mixing.

According to a preferable embodiment the aqueous suspension is mixed with shock mixers. A "shock mixer" is intended to mean herein an apparatus in which there are plate-like collision surfaces on rotating wheels, which produce the force required for mixing (after collision) causing the liquid and the suspension to drain into the direction of the centrifugal force from the blades of the inner mixing wheel to the blades of a concentric outer mixing wheel. This produces forces acting on the suspension, which are effected by the differences in the speed and/or direction of rotation between successive sets of mixing blades. The apparatus is used herein in such a way that liquid and suspension are fed into it with a smaller capacity of volume flow than that of the effluent. In such an apparatus the plates are either oriented radially or slightly tilted into the direction of rotation. The probability to yield a homogeneous mixing result in a shock mixer, due to the strikes between a solid substance and a solid mixing surface, is much greater than the probability of achieving homogeneity in any other type of mixer. Typically, more than 95% of the material flow receives almost 100% of the maximal shock energy, and only 5–10% of the material receives less than 60% of the maximal shock mixing energy. This deviation, corresponding to the intensity of turbulence, is many times greater in all other types of mixers, including even the so called "high-shear" mixers. Consequently, the re-disintegration of agglomerates and flocs formed is almost perfect in so called shock mixers in comparison to ordinary types of mixers.

The speed of rotation in a shock mixer is typically about 20–200 m/s, and the difference in peripheral speeds about 40–400 m/s.

In this invention the kaolin used comprises a conventional product of pigment or filler quality, prepared from natural kaolin by purification and fractionation. The calcium carbonate used is also a conventional product of pigment or filler quality, produced from natural limestone or from calcium carbonate, respectively. Conventional commercial qualities of talcum and titanium dioxide may be used.

The invention enables the production of pigment particles, to the surface of which small particles of precipitated calcium carbonate have been attached. The particle size of precipitated calcium carbonate is essentially 30–100 nm, and the particles are bound through physical forces, essentially by van der Waals forces, to the surface of the pigment.

In FIGS. 2a–2c, PCC particles, kaolin and kaolin flakes coated with PCC are shown. As may clearly be seen in FIG.

2c, there are PCC particles of homogeneous size attached to the surface of the kaolin flakes such that they cover essentially the whole surface. FIGS. 2a–2c are described in more detail in Example 1.

In the electron micrographs shown in 3a and 3b, chalk (natural calcium carbonate) coated with PCC may be seen. Also in this case, the PCC particles are of even size and cover the surface of the chalk. The size of the PCC particles shown in the figure is approximately 40 nm φ.

In FIGS. 4a–4c, $TiO_2$ particles coated with PCC are shown. The PCC particles cover the entire surface of the titanium dioxide particles. They have sizes in the range of about 40–60 nm. In FIG. 4a, a few separate titanium dioxide particles are shown, with diameters of about 160–170 nm. The distance between the titanium dioxide particles is greater than 60 nm, typically greater than 100 nm.

The coating and filler material (or coating and filler pigment) obtained according to the invention contains 10–90, preferably about 30–70% by weight, of pigment particles and 90–10, preferably about 70–30% by weight of PCC. After preparation it is in the form of an aqueous suspension with a content of dry solids (cds) of 5–95, preferably 40–80, most preferably about 65–75%. The cds for an aqueous pigment suspension used for coating is typically about 60–80%, for example, 70%, and the cds of a suspension to be used as a filler is about 40–60%, typically about 50%. The surfaces of pigment particles have PCC particles attached to their surfaces, the amount of PCC being 10–50% of the weight of the pigment particles.

The aqueous suspension may possibly contain other components used in pigment pastes and filler compositions, for example, 0.01–10% by weight of a polyelectrolyte, such as polyacrylic acid or a derivative thereof. If desired, the aqueous suspension of pigment particles and PCC may be dried to obtain a powder-like product. According to the intended use, the obtained pigment particles coated with PCC may be treated further with phosphoric acid or sodium silicate, which yields a better resistance towards acids for the product.

The aqueous suspension may be used as such as filler for paper, or in coatings for paper it is used for preparing compositions for coating papers.

When desired, the coated pigment particles may be separated from the aqueous suspension by filtration, for example, with a pressure filtering apparatus.

The following examples are non-limiting and are given to illustrate the invention.

EXAMPLE 1

A. Preparation of PCC

CaO φ10 mm was preground in a conical vibration crusher <2 mm φ. Hydration was performed in an ATREX mixer, at a temperature of 70–80° C., solids content 12%. $Ca(OH)_2$ was allowed to hydrate further in a tank for 20 h. Thereafter, $Na_2CO_3$ was dissolved in water, the temperature of which was above 30° C., to obtain an approximately 32% saturated solution. To initiate the causticizing process the components were mixed in an ATREX mixer. Thereafter, the reaction was allowed to proceed essentially without mixing. The temperature during the reaction step was maintained above 30° C. In order to assure the quality of the PCC coating, the reaction was quenched at 15–25 minutes after its initiation by effective ATREX mixing, which enabled achieving the desired homogeneous result (0.2–0.4 μm φ), when the crystals formed in the gel are dispersed with the NaOH formed and the loose agglomerates of in the gel are dispersed.

PCC with particle size 100–400 nm was obtained. In FIG. 2, the fine structure of PCC is shown. PCC of a maximum age of 6 months was suspended in water to form a suspension with a solids content of 40–60%. During the suspension step approximately 1% of dispersion agent (polyacrylic acid) was added.

B. Coating kaolin

To the suspension obtained in A, kaolin powder (Comalco, Australia) was added with efficient mixing by a shock mixer causing turbulence. A micrograph of kaolin is shown in FIG. 3. The pH of the aqueous suspension was maintained in the range 8–9, preferably at about 8.4–8.6. The adjustment was achieved by the use of $H_3PO_4$.

The product obtained was an aqueous suspension of coated kaolin, the electron micrograph of which was taken. This is shown in FIG. 3. In the figure the PCC particles appear as round particles with a diameter of 50 nm, and are attached to the kaolin flakes.

When the dry solids content of PCC suspension was 50%, 66.7 kg of kaolin powder was added to 100 kg of aqueous suspension, whereby 166.7 kg kaolin/PCC suspension was obtained, with cds 70%. The proportion of PCC of the dry solids was 42.8% and that of kaolin 57.2%.

On the basis of the figures, it can be estimated that there are 200 000–400 000 kaolin particles on a square millimeter, with approximately half of them coated with PCC. At the ends of the flake shaped kaolin particles, there are also PCC groups. The brightness of kaolin was improved by about 4 ISO units to a value of 92. In a reference experiment, a 50 PCC/kaolin paste by precipitation at acidic pH, had its brightness improved by 2 units from the brightness of kaolin 88.

It could also be observed that the opacity of kaolin was improved when it was coated with PCC. Apparently the PCC particles on the surface of kaolin cause small enclosures of air to form, which impair the transmission of light subsequently improving the opacity of kaolin.

Gloss is defined as the ratio of the intensity of an incoming ray of light to the intensity of a ray of light reflected from the surface of paper. Gloss is principally determined by the extent to which the kaolin particles are flake-like (shape factor). The extent to which kaolin may be flake-like is limited by the requirement of porosity in paper manufacturing. PCC 50 nm φ+ kaolin, the effect is to enhance porosity and to enable the use of kaolin which is more flake shaped. PCC 50 nm φ fill the gaps between the kaolin particles by extending the flake-like shape and they simultaneously form porous regions, which do not prevent the evaporation of water. PCC 50 nm φ particles do not affect the reflection of visible light as such, in the wavelength region 400–750 nm, and the particle size causing scattering is >200 nm φ.

EXAMPLE 2

Precipitated PCC, with a particle size of 50 nm, was treated in a chamber filtration apparatus with carbon dioxide to adjust it to pH 9.6, when the starting value was pH 10.5, by using water saturated with $CO_2$ for washing.

The pH stabilized cake, with a solids content of 50%, was transferred to a blender, in which the peripheral speeds were 40 m/s, and the differences in the speeds of the peripheral speeds of rotating blades was in the order of 80 m/s. The retention time in the blender was <0.1 s. The temperature of the suspension was ~40° C.

The PCC suspension described above and chalk were transferred to a similar blender, and the pH was adjusted to 8.4 with phosphoric acid, which caused the PCC agglomerates to disintegrate and a portion of the released 50 nm particles were attached to the surface of chalk with van der Waals forces. The temperature of the mixture was 20° C.

There were 50% of chalk and 50% of PCC. In this case ~20% of PCC was disintegrated to form coating and ~30% remained in the solution as agglomerates.

EXAMPLE 3

The experimental setup was as before, but the material to be coated was ground calcium carbonate, with the same results.

EXAMPLE 4

The objective of the experiment was to demonstrate the difference between $TiO_2$ coated with PCC and a mixture of $TiO_2$ and PCC. Coating was performed in an aqueous suspension by adjusting the pH to 7.8. For reference, the brightnesses of the pure products were also determined.

Substances tested:
1. $TiO_2$, anatase, grain size 54–178 nm, average size 166 nm, refractive index 2.55
2. PCC, vaterite crystalline form, grain size 30–60 nm, refractive index ~1.5
3. PCC precipitate, or multinuclear PCC cluster comprising 30–60 nm particles, with a size of 200–300 nm
4. $TiO_2$ coated with 30–60 nm PCC particles
5. Mixture $TiO_2$ and PCC clusters (precipitate)

TABLE 1

|  | Brightness |
|---|---|
| Clusters | 93.39 |
| $TiO_2$ | 93.58 |
| $TiO_2$ coated with PCC | 94.36 |
| Mixture of $TiO_2$ and PCC clusters | 91.35 |

As may be seen from Table 1, the brightness obtained by coating titanium dioxide with PCC particles is much better than that of a mere mixture of titanium dioxide and PCC. The brightness of the coated particles is even better than that of titanium dioxide, which is caused by the fact that the distances of titanium dioxide particles become suitable, in which case (air) space in between the particles improves the refractive index.

EXAMPLE 5

The method and material are the same as in example 4. According to this example the effects of variation in the mixture ratios on the brightness of the product was investigated (percentages are determined by weight).

TABLE 2

|  | Brightness |
|---|---|
| $TiO_2$ 100% | 94.95 |
| $TiO_2$ 10% + PCC 90% | 91.15 |
| $TiO_2$ 20% + PCC 80% | 94.35 |
| $TiO_2$ 30% + PCC 70% | 94.20 |
| $TiO_2$ 50% + PCC 50% | 92.48 |
| PCC 100% | 90.59 |

As is evident from the data in Table 2, the best results are achieved when the amount of titanium dioxide is about 10–40% of the mixture. The best experimental brightness was determined for the mixture ratio 20% of $TiO_2$ and 80% of PCC. On the basis of the average ($TiO_2$) the best coverage ratio is obtained for 30–40% $TiO_2$. The difference is caused by the larger surface area of the smaller $TiO_2$ particles, which causes the mass ratio of $TiO_2$-to-PCC to be transformed to correspond to the experimental conditions.

EXAMPLE 6

The experiment was carried out to demonstrate the importance of binding.

Pellets were pressed from $TiO_2$ and PCC particles, and these were compared under different conditions to pellets of $TiO_2$ coated with PCC. The pellets were pressed with a pressure 10 $T/cm^2$, and the thickness of the pellets formed was 1.5 mm. Brightness was determined with a Minolta instrument to obtain so called tappi values.

TABLE 3

|  | Brightness |
|---|---|
| $TiO_2$ 100% | 87.12 |
| PCC 100% | 84.44 |
| $TiO_2$ 10% + PCC 90% | 91.22 |
| $TiO_2$ 20% + PCC 80% | 92.91 |
| $TiO_2$ 30% + PCC 70% | 92.87 |

By pressing the pigments a great particle density could be obtained, and the distances between PCC and $TiO_2$ particles were caused to shorten to the extent that scattering was reduced.

As may be seen from the results presented herein above, $TiO_2$ particles (average $\phi$166 nm) coated with $\phi$~50 nm PCC particles, maintained their mutual distances and their brightness remained high.

What is claimed is:

1. A pigment particle product, which comprises from 30 to 90% by weight of particles of precipitated calcium carbonate that range in size from 30 to 100 nm and said particles are attached to the surfaces of the pigment particles of said product.

2. A product according to claim 1, wherein the pigment particles are selected from the group consisting of kaolin, calcium carbonate, titanium dioxide and mixtures thereof.

3. A product according to claim 1, wherein the particles of precipitated calcium carbonate are attached to the surfaces of the pigment particles by van der Waals forces.

4. A product according to claim 1, wherein the particles of precipitated calcium carbonate which are attached to the pigment surfaces are present in the range of 30–80% by weight, based upon the weight of the pigment particles.

5. A titanium dioxide based product according to claim 1, wherein the distances of the titanium dioxide from each other are greater than 60 nm.

6. A method for coating particles with precipitated calcium carbonate, wherein an aqueous suspension of pigment carbonate is formed by mixing in a mixer, the pH of said aqueous suspension being adjusted to a value within the range 6–11, and wherein agglomerates of precipitated calcium are first formed before mixing to a particle size in the range of 30–400 nm, and thereafter these agglomerates are disintegrated to calcium carbonate particles of 30–100 nm particle size, whereby the resultant particles of calcium carbonate are attached to the surfaces of the pigment particles.

7. A method according to claim 6, wherein the pigment particles and the precipitated calcium carbonate are mixed vigorously.

8. A method according to claim 7, wherein the pigment particles and the precipitated calcium carbonate are mixed in a shock blender type of mixer.

9. A method wherein the resultant aqueous suspension of the coated pigment particles according to claim 6 is incorporated as a filler material in paper.

10. A method wherein the resultant aqueous suspension of the coated pigment particles according to claim 6 is coated on paper.

* * * * *